March 28, 1967     A. L. PHIPPS     3,311,013
PROPELLANT LINER
Filed Jan. 9, 1963

INVENTOR.
ARTHUR L. PHIPPS
BY
Robert C. Swan
ATTORNEY

3,311,013
PROPELLANT LINER
Arthur L. Phipps, Fair Oaks, Calif., assignor to Aerojet-General Corporation, Azusa, Calif., a corporation of Ohio
Filed Jan. 9, 1963, Ser. No. 250,735
7 Claims. (Cl. 86—20)

This invention relates in general to chamber liners and more particularly to means for providing an improved bond between a chamber liner and the substance contained in the chamber.

The effectiveness of a liner between the filler in a chamber and the chamber itself is extremely critical in some uses of liners such as between a propellant and a case or chamber into which the propellant has been poured for curing. The filler material is in some instances poured into the lined chamber and cores are placed in the chamber to help form the mass in a desired manner. After the filler has been cured to a rigid or semi-rigid mass, the cores are withdrawn and the filler is then supported in the chamber only by its inherent structural properties and by the effectiveness of the bond between the filler and chamber.

Where the filler is a propellant, for example, the effectiveness of the bond between liner and propellant is critical, and burning gases may penetrate along a liner not bonded thereby causing improper combustion and possibly catastrophic failure.

The present invention avoids the inefficiency and other disadvantages of prior lining methods and instead provides a liner which presents a greatly increased area to which the filler or propellant is bonded thereby providing a stronger bond between propellant and liner and substantially increasing the efficient operation of the device.

Accordingly, it is an object of the present invention to provide a liner for installation between the chamber wall and a filler to be placed in said chamber wherein a substantially increased area is presented for bonding to the filler.

It is another object of the present invention to provide a method for bonding a chamber to a substance to be included therein which includes the use of nonepoxy liners and provides a liner-filler bond stronger than the filler itself.

Other objects and many of the attendant advantages of this invention will be readily appreciated as the same becomes better understood by reference to the following detailed description when considered in connection with the accompanying drawings wherein.

The fiber or fabric liner of the present invention provides a substantially increased bond between the chamber of a rocket motor or other enclosure and the filler or propellant to be inserted therein, or between a boot and the propellant, wherein previously encountered separation of the chamber liner to filler or boot liner to filler bond is avoided and hot gases are precluded from entering between the liner-filler interface thus avoiding malfunctions of the rocket motor.

Figure 1:
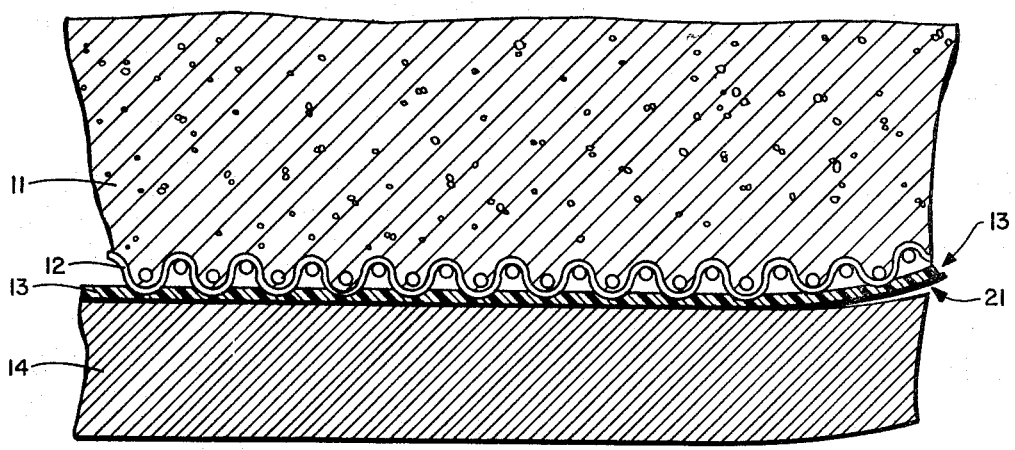
FIG. 1 is a transverse section showing one embodiment of the invention.

The embodiment of FIG. 1 shows a filler material 11, which may be a propellant or other mass embedded in or among the fibers of fiber liner 12, with the liner bonded by epoxy resin or other bonding substance 13 to the chamber 14, or to the boot 21 which is a membrane not fastened to the chamber except at its extremity. The embedding of filler 11 among the fibers of liner 12 provides a cohesion at the interface between these two which is greatly superior to that obtained between an epoxy or plastic liner or such epoxy or plastic liner having fibers inserted therein. That is, the material of the fiber being exposed to the filler before curing thereof allows the filler to occupy space between the fibers and about the filaments of the fibers themselves thereby giving a much stronger bond than that between a filler and a smooth surface.

Figure 2:
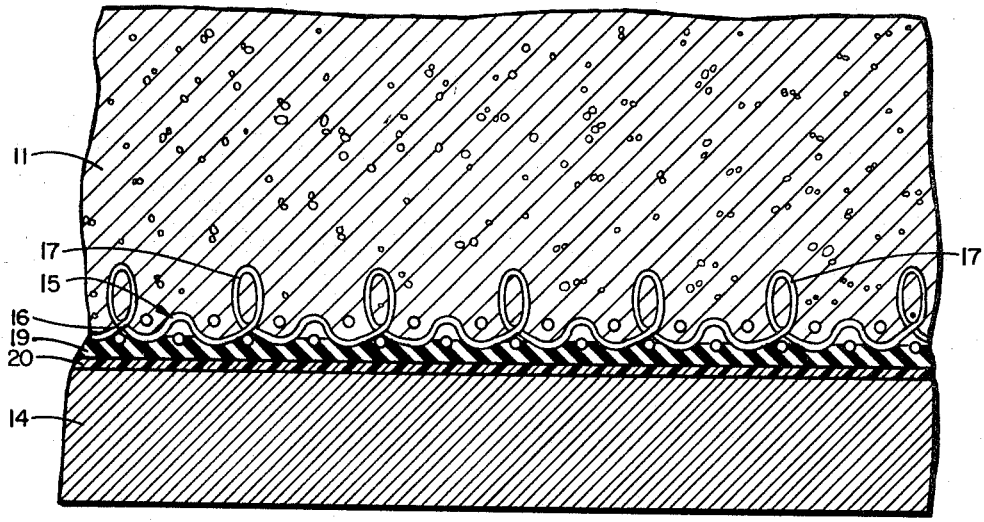
FIG. 2 shows an alternate method of adhering the liner to the chamber wall.

A second embodiment, that shown in FIG. 2, includes the use of a fabric 15 having a base material 16 and pile 17, and in this instance it is apparent that a still greater interfacial bonding surface is provided by the pile extending into the filler. Backing 19 may be used and if used is cemented at 20 to the chamber wall 14, or alternatively, the backing may be omitted and the base itself may be cemented to the chamber wall as was the base of the fabric 12 to wall 14 in FIG. 1. Similarly, the fabric 15 with or without backing may be bonded to a boot as was fabric 12 to boot 21 in FIG. 1.

The fiber and fabric liners described in the application have proven superior to the formerly used epoxy and other plastic liners, with the fabric liner having a pile being the superior of the two. The fabric liner provides both an increase in interfacial area between liner and filler due to the highly irregular surface of the liner, and a mechanical locking effect obtained by encasing of the fibers or loops within the filler.

Tensile tests of the chamber-liner-propellant bond have shown values of bond of the order of a magnitude of 3 over the tensile strength of prior methods of bonding. Rupture in these test materials occurred not between the interfaces but within the propellant itself in a random manner.

The use of fabric is thus demonstrated to be a distinct advance in the art of bonding. The selection of fabric is also of importance since a soft fabric will more than likely be crushed by the viscous uncured propellant, so that this softness may be overcome by either applying a stiffening coating to the fibers before introducing the propellant or filler, or using material or fabric whose pile will remain upright during the casting and curing process.

The effectiveness or strength of the bond is also a function of the number of loops the fabric possesses, the height of such loops, the thickness of the loops, and other matters relating to the construction of the fabric itself. Either a fabric having a loop for its pile or a cut pile is appropriate. One embodiment which has been tested is that wherein the weave of the fabric uses four or more picks per loop. Such a number of picks locks the loop in place among other loops and therefore prevents individual loops from falling through the fabric back. Either filament nylon or nonsynthetic material may be used for the loop yarn, and spun nylon may be used for backing yarns and picks. A maximum loop yarn denier of 780 has been shown to be desirable, while the minimum filament denier of 10 and a minimum number of loops per square inch of about 140 have been found preferable.

The coating on the fabric, as stated above, may or may not be used, it having been determined that propellant fillers bond adequately to nylon material itself, and therefore a face coating on such nylon may be omitted. Also, it has been determined that a reverse coating on the base material of the fabric is also unnecessary since the uncoated cloth may be bonded to chambers and a stronger bond realized than on coated ones.

Other suggested limitations are in the maximum number of loops, substantially about 300 per square inch, the maximum loop height, which above backing has been illustrated to be adequate at 0.20 inch, and a minimum loop height at about 0.6 inch.

It will be appreciated that other materials than those specified may be employed within the scope of the invention. For example, the fabric pile and fabric backing may be made of the same or of different materials such as cotton, nylon, saran, glass, metal or other organic or inorganic materials. Also, the pile-backing pair may either singly or together be impregnated with various resins or rubber such as polyurethane, epoxy, polyester, polyvinyl acetate, GR–S rubber, Buna N, neoprene, and the like, and the fabric pile may be tufts, bristles, loops or other forms within the concept of the invention.

Obviously many modifications and variations of the present invention are possible in the light of the above teachings. It is therefore to be understood that within the scope of the appended claims the invention may be practiced otherwise than as specifically described.

I claim:

1. A method of providing an effective bond between the internal surface of a chamber and a filler to be solidified in the chamber comprising adhering fiber liner means which includes pile means on one face thereof to the internal surface of the chamber with the pile means extending inwardly of and away from the internal surface of the chamber, coating the pile means with a stiffening agent, and casting the filler within the lined chamber so as to embed the stiffened pile means within the filler.

2. In a container, fabric lining means having a pair of faces, means adhering one of said faces to the internal surface of said container, pile means on the other face of said fabric lining means extending inwardly of and away from the internal surface of the container, a solid substance within said container, and said pile means being completely embedded in said solid substance with the solid substance filling the interstices formed in the fabric lining means so as to provide an effective bond between said fabric lining means and said solid substance.

3. In a container as defined in claim 2, wherein said solid substance is cast in situ within said container, and further including stiffening means on said pile means to facilitate maintenance of said pile means in a position where it extends inwardly of and away from the internal surface of the container as the solid substance is cast in situ.

4. In a container as defined in claim 2, wherein said fabric lining means comprises a fabric of interlaced nylon filaments.

5. In a container as defined in claim 4, wherein said pile means comprises at least 140 loops per square inch of said fabric lining means.

6. In a container as defined in claim 4, wherein said pile means extends inwardly of and away from the internal surface of the container for a distance not less than 0.06 inch.

7. In a rocket motor structure, a motor case having an internal surface, a fabric liner, means adhering said fabric liner to the internal surface of said motor case, said fabric liner having a pile extending inwardly of and away from the internal surface of said motor case, a solid propellant within said motor case, and said pile being completely embedded in said solid propellant with the solid propellant filling the interstices formed in the fabric liner so as to provide an effective bond between said fabric liner and said solid propellant.

References Cited by the Examiner

UNITED STATES PATENTS

| | | | |
|---|---|---|---|
| 2,697,664 | 12/1954 | Goeser et al. | 161—249 |
| 2,948,651 | 8/1960 | Waag | 161—249 |
| 2,955,974 | 10/1960 | Allen et al. | 161—186 |
| 2,995,091 | 8/1961 | Haymes et al. | 102—98 |
| 3,107,573 | 10/1963 | Butcher | 102—98 |
| 3,108,433 | 10/1963 | De Fries et al. | 102—98 |
| 3,118,380 | 1/1964 | Damon et al. | 102—98 |

BENJAMIN A. BORCHELT, *Primary Examiner.*

R. V. LOTTMANN, P. A. SHANLEY,
*Assistant Examiners.*